March 14, 1933.  J. V. GIESLER  1,900,985
PRESSURE RESPONSIVE VESSEL
Filed June 8, 1928
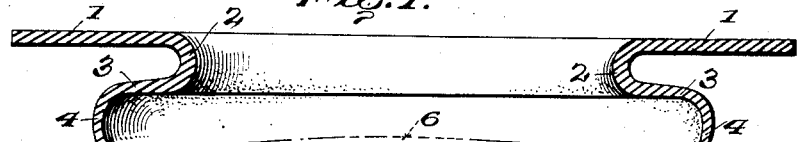
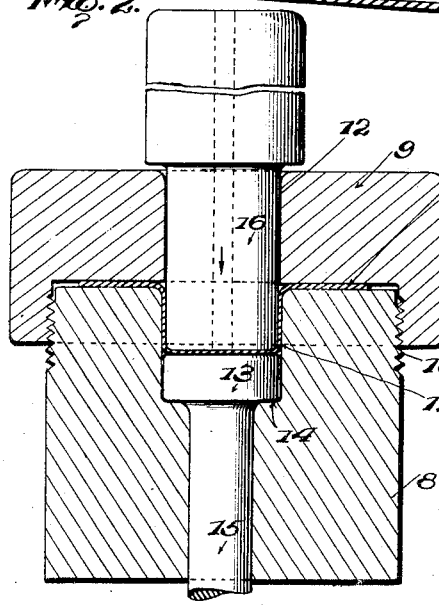
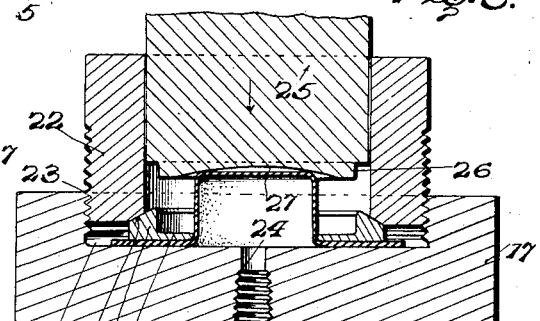
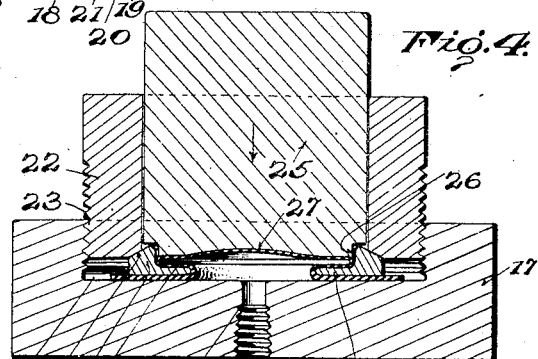
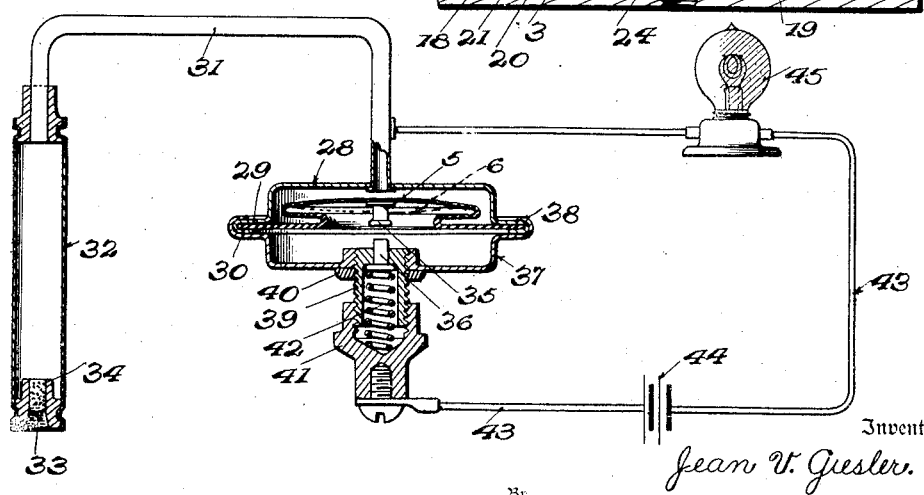
Inventor
Jean V. Giesler.
By Cameron, Kerkam and Sutton
Attorney Patented Mar. 14, 1933

1,900,985

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

PRESSURE RESPONSIVE VESSEL

Application filed June 8, 1928. Serial No. 283,970.

This invention relates to expansible and collapsible vessels, and more particularly to vessels of this type having corrugated walls.

Corrugated vessels adapted for use as thermostatic elements, as known to the art, generally comprise tubular corrugated walls having at each end a closing cap or head, thus forming a sealed vessel. The tubular walls are corrugated in a suitable manner, such as by rolling, and the heads are attached to the walls, as by soldering or the like; and such vessels have a considerable range of movement, due to the presence of a plurality of corrugations, which movement is generally proportional to the variations in pressure to which they are subjected. In many instances, however, only a very small expansion and contraction of the vessel is required, and in such cases the corrugated vessel or bellows of the type described involves an unnecessary and economically unsound utilization of material and production cost.

It has been found that a bellows of novel construction may be formed with a very small number of corrugations, or even only one complete corrugation, and be entirely satisfactory for certain work. Furthermore, owing to its novel construction, such a bellows is capable of a relatively great movement for very small variations in the pressure to which it is subjected, which renders it very sensitive and delicate in responding, for example, to minor variations of temperature in the surrounding medium. Such a bellows is particularly useful where a desired action is to be initiated at an accurate predetermined temperature.

One of the objects of the present invention is therefore to provide a novel bellows having a small number of corrugations and which is very sensitive to small variations in pressure or temperature.

Another object is to provide such a bellows having a relatively large range of movement in response to small variations in temperature or pressure.

A further object is to provide a novel integral one-piece bellows including a small number of corrugations, a head, and a supporting base or flange.

Another object is to provide a dished diaphragm capable of buckling between two normal positions, and having a novel radially expanding mounting for the periphery thereof.

Other objects will appear hereinafter as the description of the invention proceeds.

With the above objects in view, the bellows comprises an integral one-piece cup, having a peripheral supporting base or flange at its rim, the bottom of the cup constituting the bellows head, and the wall of the cup having a small number of corrugations to provide for movement of the head relative to the supporting base. In the preferred form, the cup is shallow and has only one complete corrugation in its wall, that is, the wall of the cup adjacent the base is turned outwardly, substantially paralleling said base, and is then turned inwardly to form the bottom of the cup or the movable bellows head, and the wall of said corrugation progressively varies in thickness. Preferably, also, the said head is dished so that it may occupy either one of two normal positions, on either side of an intermediate position. To this end, the corrugation is preferably made sufficiently deep to provide a laterally extending portion of substantial radial extent, permitting the curved wall adjacent the head to expand radially as the head passes through its intermediate position.

This arrangement constitutes a radially expanding peripheral mounting for the dished head or diaphragm, with the result that, for any given radial expansion of the diaphragm head, less pressure is required to effect its buckling than would be required if the periphery were rigidly mounted. It follows that for any given pressure acting on the diaphragm head to cause buckling, a greater range of axial movement may be obtained with this mounting, because a greater radial expansion may take place under that pressure and therefore the diaphragm head may be dished deeper.

Such a bellows may be constructed in any suitable manner, but in practice the novel method and apparatus hereinafter described is employed.

The invention may be better described, by way of example, by reference to the accompanying drawing wherein the practice of the method is set forth in connection with one preferred form of apparatus which may be employed to carry it out. It is to be expressly understood, however, that this drawing is for purposes of illustration only, and is not to be construed as a definition of the limits of the invention, reference being had to the appended claims for this purpose.

In the drawing,

Fig. 1 shows a section of the finished bellows;

Fig. 2 illustrates the first step in the process of forming the bellows;

Figs. 3 and 4 illustrate successive steps in the method of manufacturing the bellows, together with a form of apparatus which may be employed to practice the method; and Fig. 5 illustrates by way of example one application of the completed bellows in practical use.

Referring now to the drawing wherein like reference characters indicate like parts throughout the several views, Fig. 1 shows a complete one-piece bellows, of suitable resilient material such as thin brass, which bellows comprises a supporting base or flange, a diaphragm head, and a corrugated wall connecting the head and the base, the elements being so arranged as to constitute substantially a shallow cup. In the form shown in this figure, the wall of the cup comprises but a single corrugation. The device comprises a peripheral supporting flange or base 1, which base is bent out of its plane at 2 and is curved outwardly to extend substantially parallel to the flange 1 at 3. The portion 3 is in turn bent out of its plane at 4 and is curved inwardly to form the bellows head or diaphragm 5. The diaphragm or head 5 is shown as depressed at its center or dished, so that it occupies either one of two normal positions, one being shown at 5 in full lines and the other in dotted lines indicated by 6. With the diaphragm in either position, if a pressure be applied thereto in the proper direction, the diaphragm may be caused to buckle and to pass from one normal position to the other.

The theoretical explanation of what takes place during this action may not be fully understood, but may be explained as follows. Assuming the diaphragm to be in the position 5, and assuming pressure applied thereto tending to force the center of the diaphragm into an intermediate position, it will be observed that either one or both of two things must happen; either the metal in the center of the diaphragm must be compressed, or the diaphragm must expand radially at its periphery, or both actions may take place. But whether or not both of these actions take place, or whatever may be the true explanation, it is clear that there is a tendency toward radial expansion at the periphery of the diaphragm. It is also clear that if the diaphragm is so mounted that this radial expansion is relatively free and unrestrained, the buckling action of the diaphragm will be greatly facilitated.

In the bellows shown, the periphery of the diaphragm head 5 is relatively free to expand radially, owing to the flexibility of the supporting walls 2, 3 and 4. As pressure is applied to the diaphragm, the bellows first tends to flatten, the portion 3 of the wall being bent about the curved portion 2, and as the pressure gradually increases, the wall 4 tends to expand outwardly and to increase its diameter, thereby allowing the diaphragm to expand radially and move to its intermediate position, whereupon the nature of the stresses set up therein is such that the diaphragm is snapped rapidly to the dotted line position 6. If pressure now be applied to the diaphragm in the position 6, substantially the reverse operation takes place.

The flexible and radially expansible mounting for the diaphragm permits of the latter being dished considerably deeper than would otherwise be practicable, since a given pressure acting on the diaphragm encounters less resistance to radial expansion thereof, and a greater expansion may therefore be provided for. Considerable range of movement for minor variations in pressure is thus provided, since the diaphragm not only flexes but is bodily displaced axially, and snaps to its extreme position when the pressure reaches a predetermined limit. The limiting pressure may be thus very accurately defined within very small limits.

It will be observed that the wall of the bellows gradually decreases in thickness from the flange 1 to the diaphragm head 5. This thinning of the wall is carried out during the manufacture of the bellows, preferably as hereinafter described, and since the decrease in thickness is a measure of the amount of working of the metal, the wall of the completed bellows has a resilience which increases roughly in proportion to the decrease in thickness of said wall. If desired, the progressive decrease in thickness may be carried on throughout the diaphragm head 5.

Referring now to Figs. 2 to 5, inclusive, the practice of the method which has been broadly set forth above is illustrated in connection with one from of appartus whereby the same may be carried out. The blank from which the bellows is made is preferably a round, flat thin disc of a suitable resilient material, and the first step in the method consists in drawing or otherwise forming a cup-shaped depression in the center portion of the blank. Referring to Fig. 2, this may be accomplished by clamping a flat blank 7 between a die 8 and a clamping ring 9 which is shown as threaded on the die 8 at 10. The die 8 and clamping ring 9 are provided with alined central openings 11 and 12. Movable in the opening 11 of the die is a plunger 13, normally seated on a shoulder 14 formed in the die opening 11, and provided with a rod 15 which may be actuated to displace the blank from the die after the drawing operation is completed. A punch 16 is slidable in the opening 12 of the clamping ring 9 and is arranged to enter the opening 11 in the die 8. When the blank 7 is clamped in position, and the punch 16 is displaced, the center portion of the blank is drawn out into a cup-shaped depression as shown in Fig. 2, whereupon the clamping ring 9 is removed and the blank is ejected from the die by means of the plunger 13. Preferably this drawing operation is carried out in steps, each successive step carrying the drawing further to increase the depth of the cup, and stretching out and thinning the wall thereof.

In the apparatus shown for the practice of the corrugating method, the corrugation of the wall of the cup and the dishing of the bottom thereof are preferably carried out in a single apparatus and operation, Fig. 3 showing the initiation of this operation and Fig. 4 showing its completion. Referring to Fig. 3, a base or support 17 is provided with a well or depression 18 into which the partially completed blank is placed in inverted position, with the flange of the cup resting on the bottom of the well. Suitable means are provided for rigidly clamping the blank in this position, and the corrugation of the wall of the cup is carried out by restricting said wall at desired points and bulging the wall intermediate said points, in order to form the corrugations. In the form of the apparatus shown, adapted to form a single corrugation, the clamping means and the means for restricting the wall of the cup are embodied in a single member, comprising a ring 19, which rests upon and clamps the flange of the blank in place. The inner diameter of the ring 19 is approximately the outer diameter of the wall of the cup, so that the ring 19 serves as a die member on which the wall of the cup may be bulged outwardly to form the desired corrugation. The radial extent of the bulge or corrugation is determined by a raised peripheral portion 20 of the ring 19.

Any suitable means may be employed for securing the ring 19 tightly in position, and in the form shown, the raised portion 20 of the ring has an outwardly and downwardly inclined upper surface 21, which is engaged by a correspondingly inclined surface of a clamping ring 22 threaded into the well 18. Preferably, the ring 19 is made in two or more parts, for convenience in positioning and removing the same, and the inclined cooperating surfaces clamp the ring 19 against movement both radially and upwardly.

In order to accomplish the bulging of the cup, a pressure is applied internally of the cup, and a pressure is applied externally to the bottom thereof, the combined effect of these pressures being to flatten the cup and to bulge the wall outwardly. Preferably, the internally applied pressure is hydrostatic, and in the apparatus shown, a fluid under pressure is admitted to the interior of the cup through an opening 24 in the base 17. The pressure externally applied to the bottom of the cup comprises preferably a mechanical force, and, as shown, is applied by means of a plunger 25 slidable in and guided by the clamping ring 22, and having a projecting end portion of somewhat reduced diameter, adapted to enter within the raised portion 20 of the ring 19 when the plunger is displaced. Preferably, the dishing of the bottom of the cup is obtained in one single operation in the same apparatus, and to this end the face of the portion 26 of the plunger is concave at 27.

The parts are shown in Fig. 3 in their positions at the initiation of the operation. As the plunger 25 is displaced downwardly, it acts to flatten the cup, and to cause the wall thereof to buckle. The hydrostatic pressure within the cup causes the said wall to buckle outwardly, and to be bent around and to lie closely against the die ring 19 to form the portion 3 of the completed blank, as will be understood from a comparison of Figs. 3 and 4, and causing further stretching and thinning of the wall of the cup. The shoulder on the plunger 25 also cooperates with raised portion 20 of ring 19 to predetermine the approach of the plunger 25 to the ring 19 and thereby determine the axial width of the portion 4 of the completed blank. The hydrostatic pressure likewise acts to bulge the bottom of the cup outwardly into the concave end 27 of the plunger 25 to form the dished bottom of the completed bellows. The operation represented in Figs. 3 and 4 may be carried out in one stage but is preferably carried out in two or more stages, and between the successive stages the partially completed blank may be removed and annealed and replaced in the apparatus for further treatment. The completed bellows thus formed is illustrated in an enlarged view in, and has been described in connection with, Fig. 1.

Such a bellows is obviously capable of widely varying applications, but for purposes of illustration it is illustrated in Fig.

5 in an apparatus for closing an electric circuit at a predetermined temperature to operate an alarm signal. Referring now to this figure, the bellows is placed within a surrounding rigid cup 28 and encloses therewith a space constituting a thermostatic vessel. The bellows may be attached to the cup 28 in any suitable manner as by soldering or brazing, or, as shown, the cup 28 may be provided with a peripheral flange 29 which is spun over the edge of the flange 1 of the bellows at 30. A tube 31 connects the said thermostatic vessel with a suitable bulb 32 adapted to contain a thermostatic fluid and subjected to the temperature of the desired medium. The bulb 32 may be of any suitable type, and preferably includes a filling opening which may be sealed after filling with means such as a cork 34 and solder 33. As the temperature within the bulb 32 increases, the pressure of the thermostatic fluid therein likewise increases and acts on the diaphragm head 5 of the bellows tending to snap it into the dotted line position 6, as above described in connection with Fig. 1. The diaphragm head is shown as carrying an electric contact 35 adapted to engage a contact 36 when the diaphragm snaps across and to complete an electric circuit hereinafter described.

The cooperating contact 36 may be mounted in any suitable manner, either independently of or together with the thermostatic vessel, as conditions may require. In the form shown, a cup 37 is attached to the thermostatic vessel by means of a rim 38 and has a central opening in its bottom into which is threaded a bushing 39 of insulating material which carries the contact 36. A lock nut 40 secures the bushing in position. The bushing 39 has an interior recess open at one end of the bushing, which may be closed by a suitable metal cap 41 threaded on the bushing 39. A coil spring 42, is placed in said recess, and serves to yieldingly support the contact 36 and to make an electrical connection between said contact and the cap 41. From the cap 41 a cable 43 leads to a source of electricity 44, and thence to a lamp or other indicating device 45, and thence to some point conductively associated with the contact 35, such as the tube 31.

When the contact 35 engages the contact 36, by reason of the diaphragm 5 snapping into the dotted line position 6, an electric circuit is completed from the source 44 to the lamp 45, tube 31, cup 28, the bellows flange 1, wall and head 5, contact 35, contact 36, spring 42, cap 41, and back to source 44 through the cable 43. When this circuit is closed as above described, the lamp 45 lights, thus indicating that a certain temperature has been reached in the bulb 32. As has been explained above, the predetermined temperature at bulb 32 may be very accurately determined, and the bellows will operate to close the circuit within very narrow limits of pressure in the thermostatic system.

The bellows which has been described is obviously capable of widely varying applications, not only possesses the important advantages of a large range of movement for minor variations in temperature, a snap action and extreme accuracy in operation, but it is also in a form which lends itself readily to commercial quantity production at unusually low costs. Whereas the usual bellows, when employed for such work, involves not only a needless use of material, but also requires extensive rolling or swaging operations to form the corrugations, the novel bellows of this invention involves a minimum of material and is capable of manufacture by a quick, simple process which results in great economy. Furthermore, whereas the usual form of corrugated bellows is so designed as to require a separate head to be attached to the corrugated wall, the novel bellows of this invention may be made integrally in one piece. Thus again manufacturing economies are effected, and possibilities of leakage are greatly reduced.

While only one form of the bellows and only one application thereof have been described and illustrated in the drawing, it is to be expressly understood that not only is the bellows itself capable of various forms of mechanical expressions and variations in the form and proportions thereof, but also the bellows is capable of many and widely varying applications which will readily occur to those skilled in the art. Furthermore, the method of making corrugated bellows hereinbefore set forth is not restricted to the manufacture of the specific bellows shown, but may be extensively practiced in the manufacture of such devices of various forms; and it is likewise to be understood that the apparatus herein disclosed is susceptible of variations in view of the conditions to be met and the ends to be attained. Reference is therefore to be had to the appended claims for a definition of the limits of the invention.

What is claimed is:

1. A device of the class described comprising a one-piece cup-shaped member of resilient material having a corrugated lateral wall of progressively decreasing thickness.

2. A device of the class described comprising a one-piece cup-shaped member of resilent material having a single corrugation in its lateral wall, the wall of said corrugation varying progressively in thickness.

3. A device of the class described comprising a one-piece cup-shaped member of resilient material having a corrugated lateral wall of progressively varying thickness, and a dished bottom adapted to be buckled into alternative positions of convex and concave curvature.

4. A device of the class described comprising a dished member, a supporting base therefor, and a flexible wall tapering in thickness and connecting said member and base.

5. A device of the class described comprising a dished member, a supporting base therefor, and a flexible wall tapering in thickness and having a single corrugation therein connecting said member and base.

6. A device of the class described comprising a dished member adapted to buckle between two normal positions, a base therefor, and a laterally flexible wall of progressively varying thickness connecting said member and base.

7. A device of the class described comprising a dished member adapted to buckle between two normal positions, a base therefor, and a laterally flexible and longitudinally extensible and contractible wall of progressively varying thickness connecting said member and base.

8. A thermostatic vessel comprising a one-piece cup-shaped member of resilient material having a corrugated wall of progressively varying thickness, a peripheral flange, and a dished bottom adapted to buckle between two normal positions, and a wall secured to said flange and enclosing with said member a fluid-tight space.

9. A device of the class described comprising a one-piece cup-shaped member of resilient material having a corrugated wall and a peripheral flange, said wall decreasing in thickness from said flange to the bottom of the cup.

10. A device of the class described comprising a cup-shaped member of resilient material having a corrugated wall and having a progressively increasing resilience from the rim to the bottom of the cup.

In testimony whereof I have signed this specification.

JEAN V. GIESLER.